(12) United States Patent
Cai et al.

(10) Patent No.: US 7,607,621 B2
(45) Date of Patent: Oct. 27, 2009

(54) FLAT PANEL DISPLAY WITH DETACHABLE BASE

(75) Inventors: Zhi-Yuan Cai, Shenzhen (CN); Te-Hsu Wang, Miao Li (TW); Chih-Jen Sun, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/474,583

(22) Filed: Jun. 26, 2006

(65) Prior Publication Data

US 2006/0289716 A1 Dec. 28, 2006

(30) Foreign Application Priority Data

Jun. 24, 2005 (TW) ............... 94210712 U

(51) Int. Cl.
*F16M 11/16* (2006.01)

(52) U.S. Cl. ............. 248/188; 248/221.11; 248/222.11; 361/681; 348/825

(58) Field of Classification Search .............. 248/188.1, 248/917, 920, 923, 921, 922, 919, 221.11, 248/221.12, 222.11, 222.12; 348/825, 826, 348/830, 829; 361/681, 682, 683
See application file for complete search history.

(56) References Cited

U.S. PATENT DOCUMENTS

| | | | | |
|---|---|---|---|---|
| 4,528,597 A * | 7/1985 | Klein et al. .................. 348/838 |
| 4,880,191 A * | 11/1989 | Lake, Jr. ...................... 248/371 |
| 4,898,493 A * | 2/1990 | Blankenburg ............... 403/326 |
| 5,122,928 A * | 6/1992 | Lo ............................... 361/681 |
| 5,128,662 A * | 7/1992 | Failla .......................... 345/1.3 |
| 5,144,290 A * | 9/1992 | Honda et al. ................ 345/156 |
| 5,253,139 A * | 10/1993 | Satou .......................... 361/681 |
| 5,398,157 A * | 3/1995 | Paul ............................ 361/684 |
| 5,575,545 A * | 11/1996 | Wang .......................... 312/7.2 |
| 6,007,038 A | 12/1999 | Han |
| 6,010,111 A * | 1/2000 | Cho ....................... 248/346.06 |
| 6,108,195 A * | 8/2000 | Behl et al. ................... 361/681 |
| 6,375,283 B1* | 4/2002 | Kitamura et al. ............. 312/7.1 |
| 7,175,144 B2* | 2/2007 | Yen et al. ................ 248/221.11 |
| 2003/0230693 A1* | 12/2003 | Yen et al. .................. 248/346.3 |
| 2007/0045505 A1* | 3/2007 | Chen .......................... 248/558 |

* cited by examiner

*Primary Examiner*—Kimberly T Wood
(74) *Attorney, Agent, or Firm*—Wei Te Chung

(57) ABSTRACT

An exemplary flat panel display (2) includes a display module (20), a supporting member (30) attached to the display module, and a base (40) engaged with the supporting member. The supporting member includes engaging members (31), and the base includes elastic arms (411). The engaging members detachably engage with corresponding elastic arms whereby the supporting member is detachably engaged with the base. The base can be detached from the supporting member of the flat panel display whenever desired. Therefore once the flat panel display has been newly manufactured, it can be conveniently wrapped and transported at a reduced cost.

10 Claims, 6 Drawing Sheets

FLAT PANEL DISPLAY WITH DETACHABLE BASE

FIELD OF THE INVENTION

The present invention relates to display devices and their supporting structures, and more particularly to a flat panel display with a detachable base.

BACKGROUND

Generally, a flat panel display mainly includes a display module, a supporting member engaging with and supporting the display module, and a base for holding the supporting member.

Referring to FIG. 8, a conventional flat panel display 1 includes a display module 11, a support 12, and a base 13. The support 12 is integrally formed with the base 13. In assembly, the display module 11 is pivotably attached to the support 12. Thereby, the display module 11 is tiltably fixed on the base 13 via the support 12.

However, the support 12 cannot be detached from the base 13, and the combined support 12 and base 13 may occupy an unduly large space. Therefore once the combined support 12 and base 13 has been manufactured, wrapping and transportation of the product can be unduly inconvenient and costly.

Accordingly, what is needed is a flat panel display that can overcome the above-described deficiencies.

SUMMARY

A flat panel display includes a display module, a supporting member with at least one engaging member, and a base with at least one elastic arm. The supporting member engages with the display module, and the engaging member engages with the elastic arm to make the supporting member detachably engage with the base.

The flat panel display includes a detachable base and supporting member, therefore the wrapping and transportation of the product can be convenient and lower cost.

Other advantages and novel features will become more apparent from the following detailed description when taken in conjunction with the accompanying drawings.

DETAILED DESCRIPTION OF PREFERRED EMBODIMENTS

Reference will now be made to the drawings to describe the present invention in detail.

Figure 1:
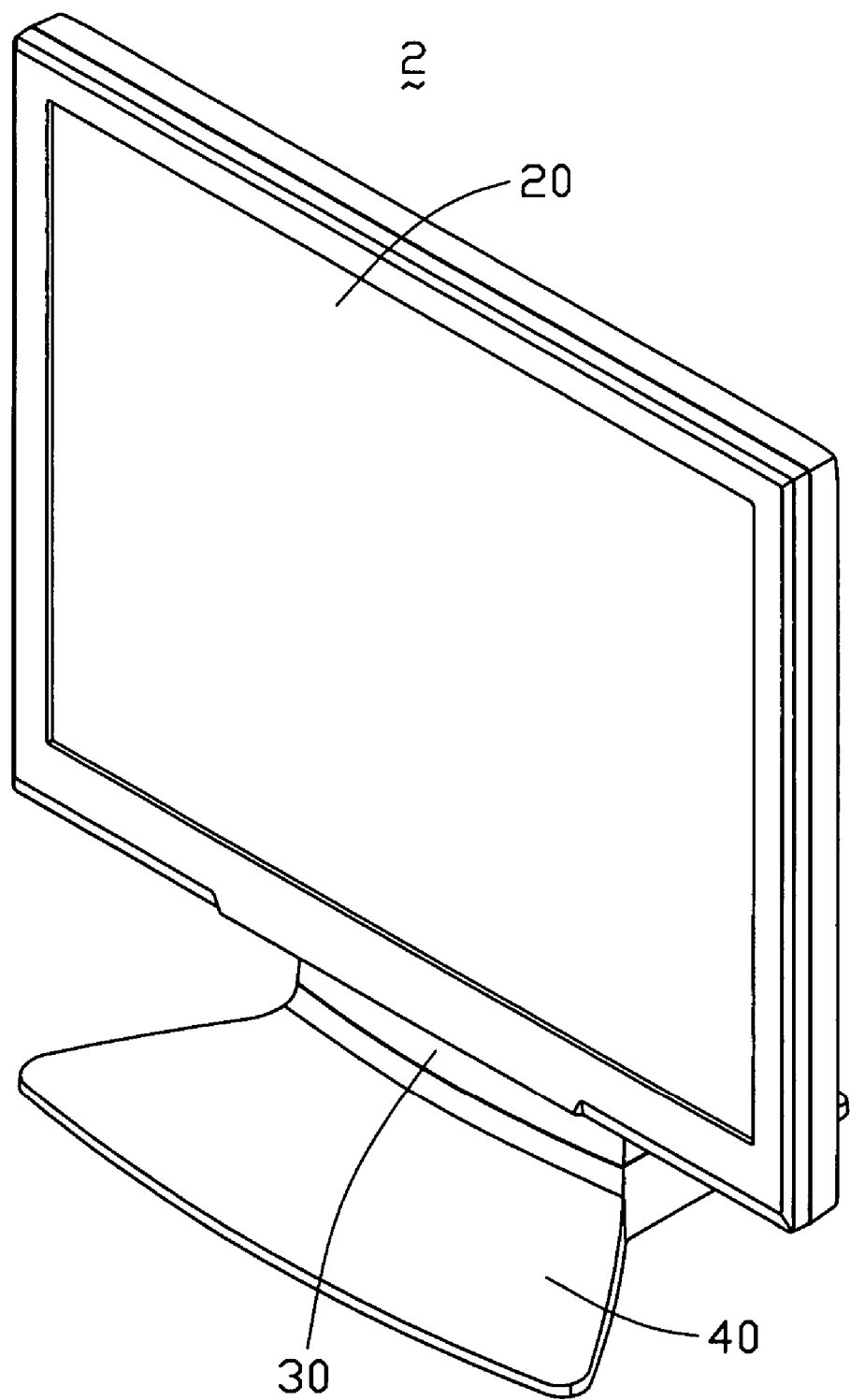
FIG. 1 is a front perspective view of a flat panel display according to an exemplary embodiment of the present invention.
Figure 2:
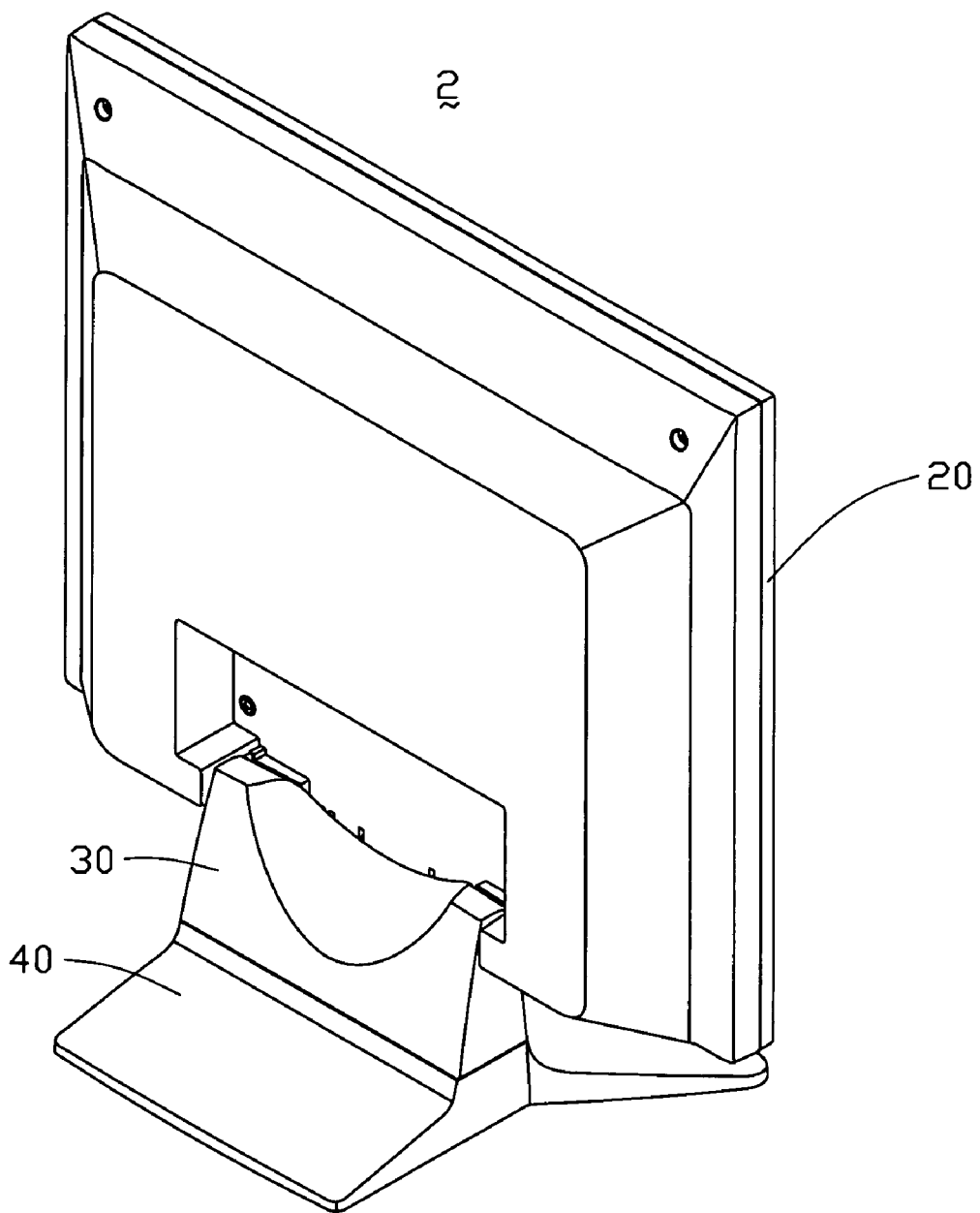
FIG. 2 is a rear perspective rear view of the flat panel display of FIG. 1.

Referring to FIGS. 1-2, a flat panel display 2 according to an exemplary embodiment of the present invention includes a display module 20, a supporting member 30, and a base 40. The display module 20 is pivotably engaged with the supporting member 30, and the supporting member 30 is detachably attached on the base 40.

Figure 3:
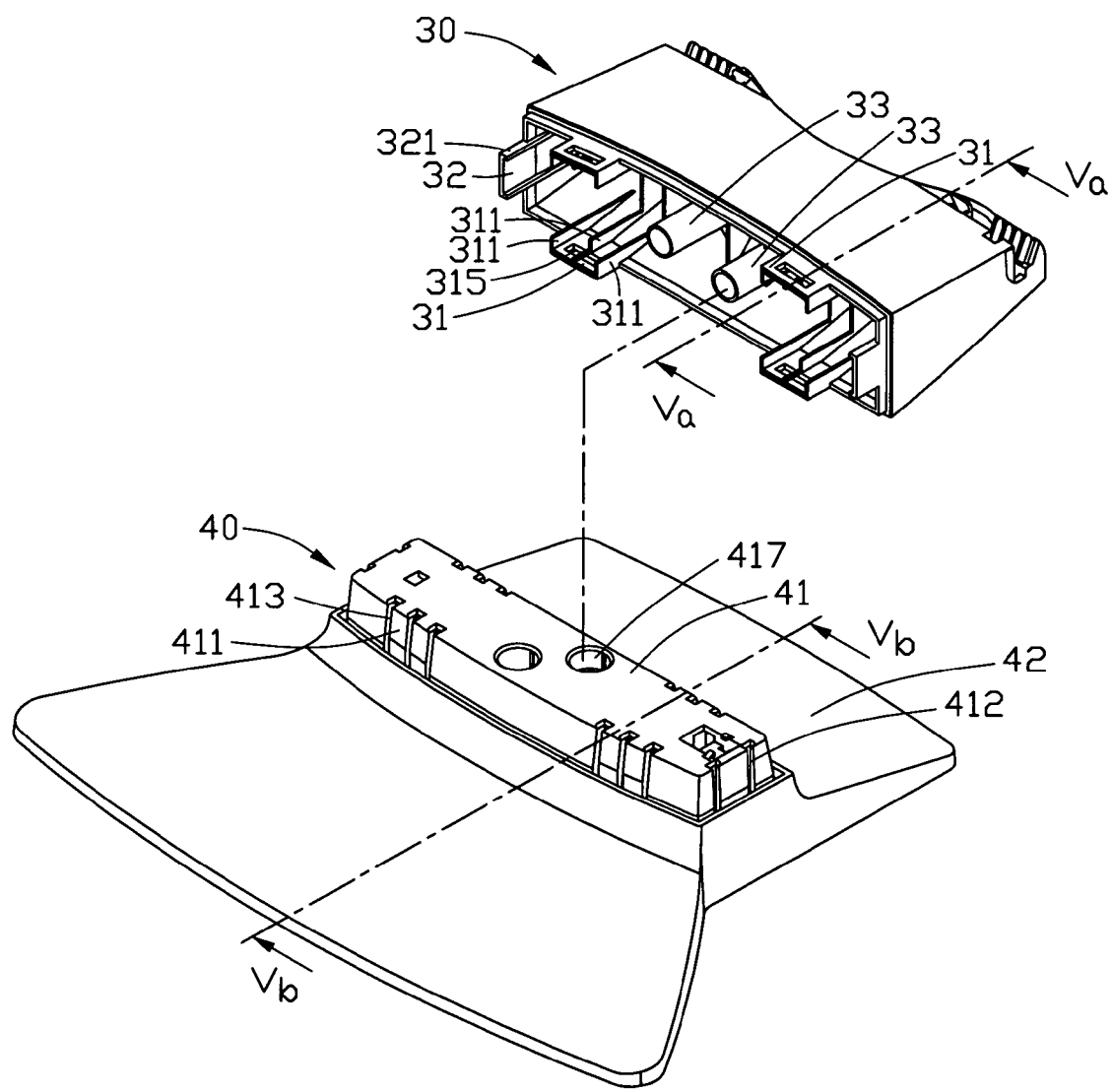
FIG. 3 is an exploded, perspective view of a base and a supporting member of the flat panel display of FIG. 1.

Referring also to FIG. 3, this is an exploded, perspective view of the supporting member 30 and the base 40. The supporting member 30 includes four first tenons 31, two second tenons 32, and two positioning posts 33. Two of the first tenons 31 extend down from a bottom of a front wall of the supporting member 30. The other two first tenons 31 extend down from a bottom of a rear wall of the supporting member 30, and are directly opposite the first tenons 31 at the front wall. Each of the first tenons 31 includes three parallel first ribs 311 at an inner side thereof, and an inserting hole 315. The inserting hole 315 is located below a middle one of the first ribs 311, near a bottom edge of the first tenon 31. The second tenons 32 extend down from opposite end walls of the supporting member 30, respectively. Each of the second tenons 32 includes two second ribs 321. The positioning posts 33 extend down from an inside of the supporting member 30, and protrude below the front, rear and end walls of the supporting member 30.

Figure 4:
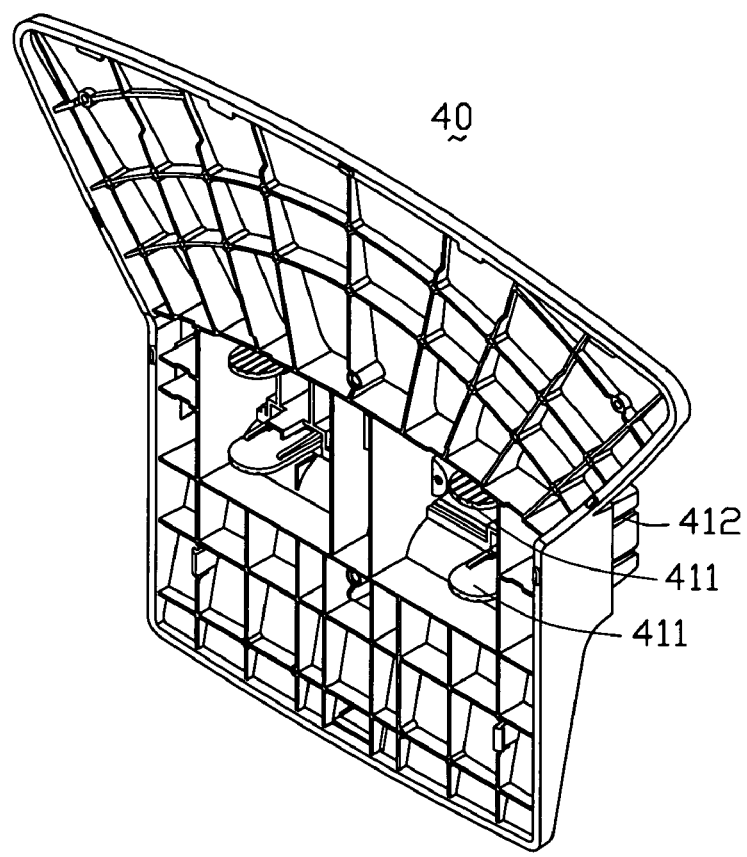
FIG. 4 is a bottom perspective view of the base of FIG. 3.

The base 40 includes an upper connecting portion 41 and a lower main body 42. The connecting portion 41 extends upwardly from a middle portion of the main body 42. Also referring to FIG. 4, the connecting portion 41 includes four elastic arms 411, four pairs of first grooves 413, two pairs of second grooves 412, and two columnar positioning holes 417. Two of the elastic arms 411 extend down from a bottom of a front wall of the connecting portion 41. The other two elastic arms 411 extend down from a bottom of a rear wall of the connecting member 41, and are directly opposite the elastic arms 411 at the front wall. Each elastic arm 411 includes a lower hook 415 (shown in FIG. 5B) and an upper groove (not labeled) aligned along a middle portion thereof, parallel to the pair of grooves 413. That is, the hook 415 is located below the groove, at a lower portion of the elastic arm 411. Each of the elastic arms 411 is located between a corresponding pair of the first grooves 413. The pair of first grooves 413 and the groove (not labeled) of each elastic arm 411 correspond to the first ribs 311 of a respective one of the first tenons 31. The two pairs of second grooves 412 are defined in opposite end walls of the connecting portion 41, respectively. Each pair of second grooves 412 corresponds to the second ribs 321 of a respective one of the second tenons 32. The two positioning holes 417 are located corresponding to the two positioning posts 33, respectively.

Figure 5A:
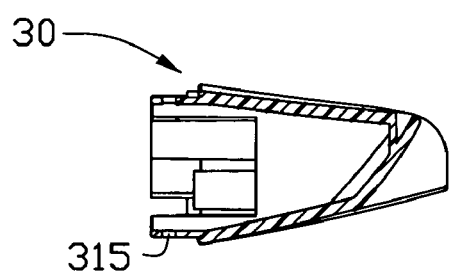
FIG. 5A is a cross-sectional view taken along line Va-Va of FIG. 3.
Figure 5B:
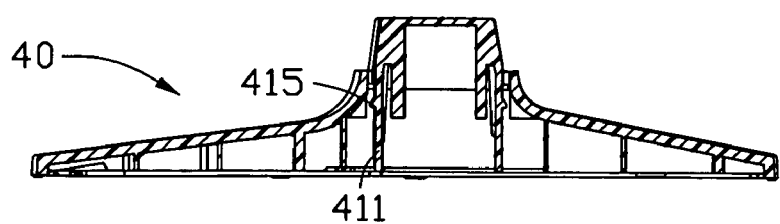
FIG. 5B is a cross-sectional view taken along line Vb-Vb of FIG. 3.

Referring to FIGS. 5A and 5B, in assembly, firstly, the positioning posts 33 are respectively aligned with the positioning holes 417 for positioning the supporting member 30, the first ribs 311 are aligned with the corresponding first grooves 413 and the grooves (not labeled) of the elastic arms 411, and the second ribs 321 are aligned with the second grooves 412. Secondly, the supporting member 30 is lightly pressed down onto the base 40. The positioning posts 33 are received along the positioning holes 417, the first ribs 311 are received along the corresponding first grooves 413 and the grooves (not labeled) of the elastic arms 411, and the second ribs 321 are received along the second grooves 412. The supporting member 30 continues to move down, with the elastic arms 411 resiliently deforming, until the hooks 415 of the elastic arms 411 are snappingly received into the inserting holes 315 of the tenons 31.

Figure 6:
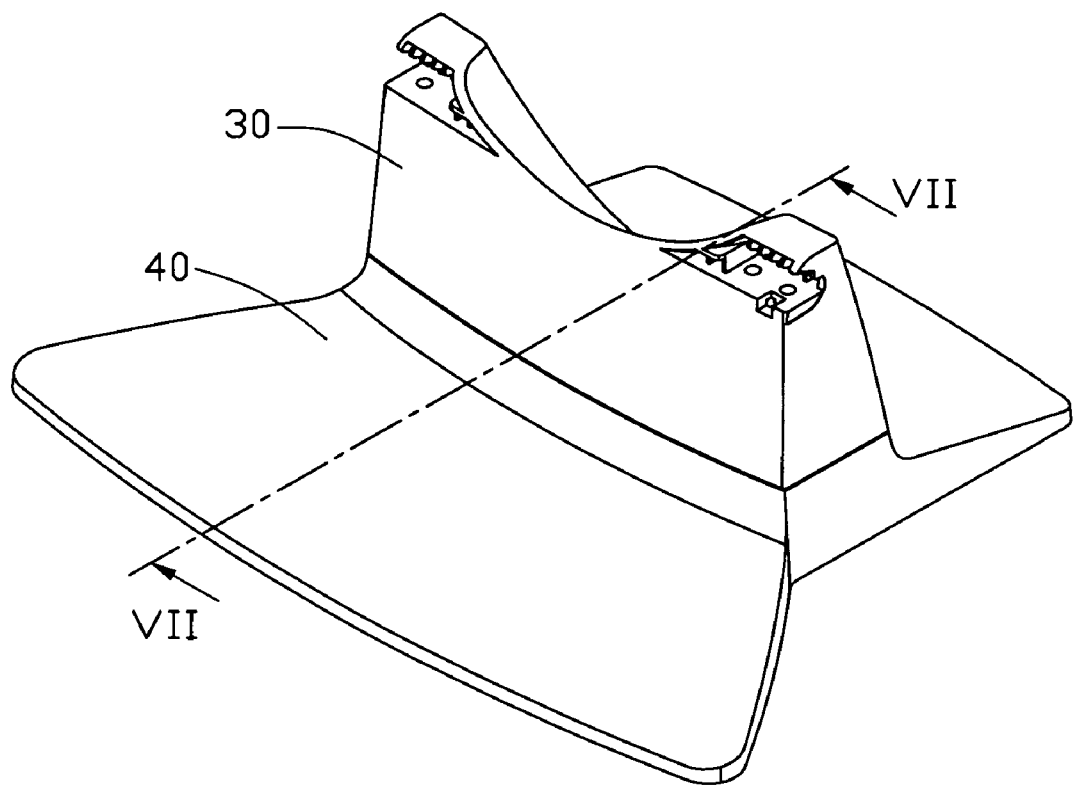
FIG. 6 is an assembled view of the base and the supporting member of FIG. 3.
Figure 7:
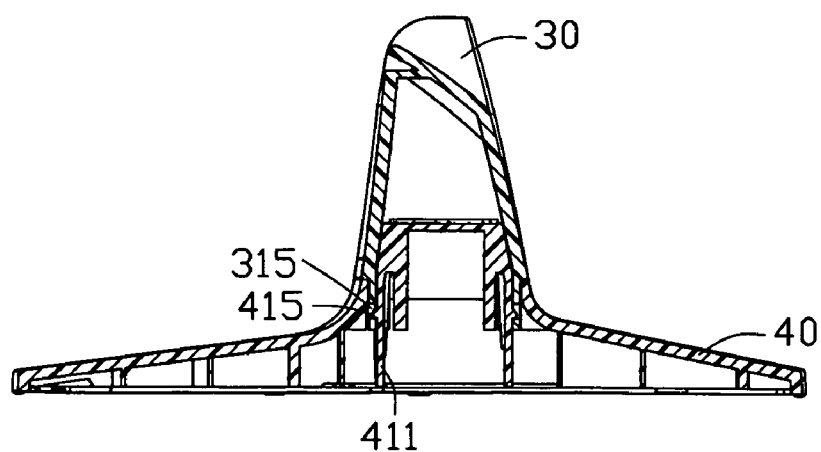
FIG. 7 is a cross-sectional view taken along line VII-VII of FIG. 6.
Figure 8:
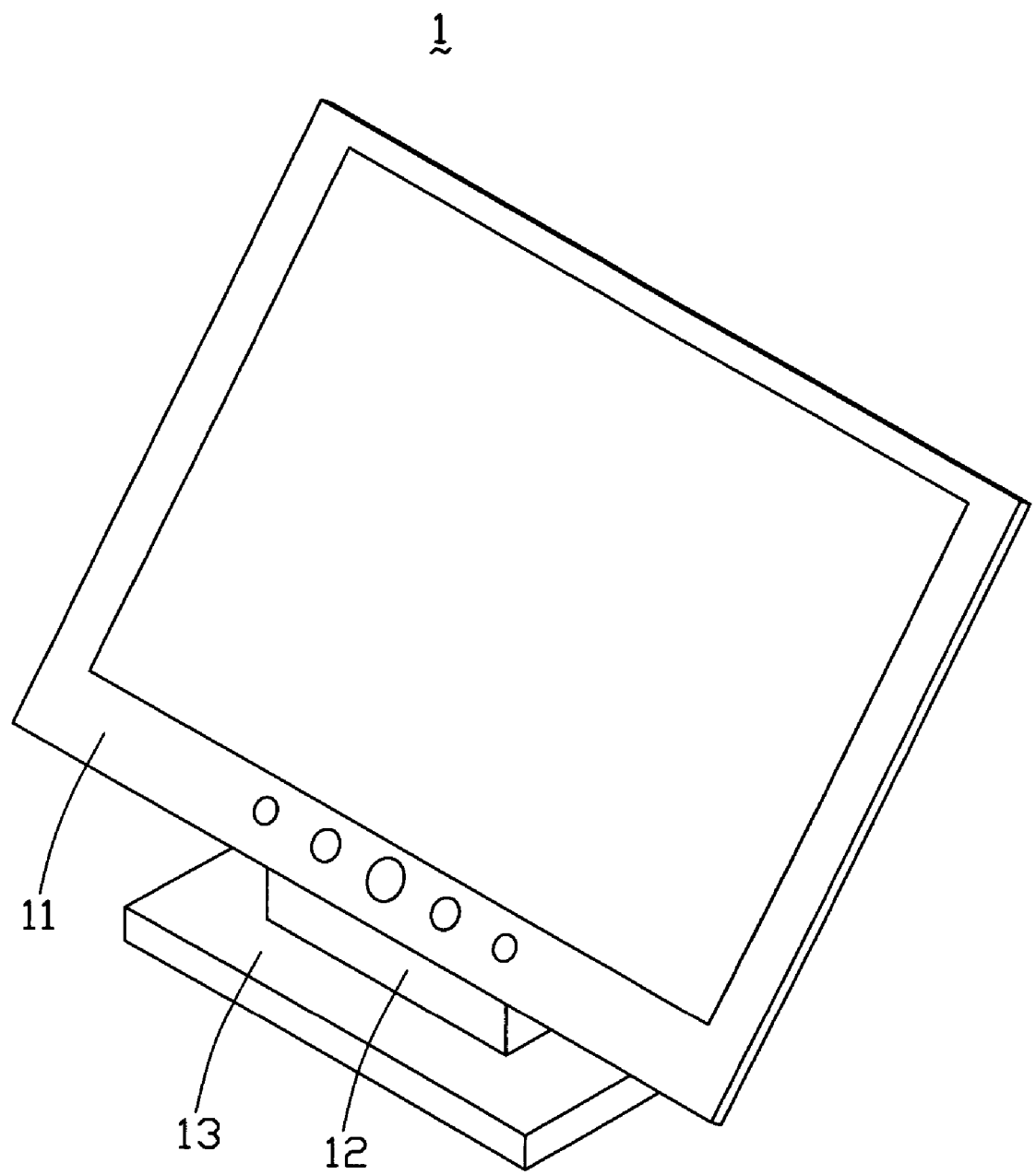
FIG. 8 is a perspective view of a conventional flat panel display.

Also referring to FIGS. 6-7, after assembly, the hooks 415 of the elastic arms 411 are tightly fastened in the inserting holes 315 of the tenons 31, the positioning posts 33 are engaged in the positioning holes 417, the first ribs 311 are engaged in the corresponding first grooves 413 and the grooves (not labeled) of the elastic arms 411, and the second ribs 321 are engaged in the second grooves 412. Thereby, the supporting member 30 is tightly and securely engaged with the base 40.

In disassembly, a pair of opposite elastic arms 411 that are at the front and rear walls of the connecting member 41 respectively are accessed via an underside of the base 40 and lightly squeezed toward each other, and simultaneously the other pair of opposite elastic arms 411 are accessed via the underside of the base 40 and lightly squeezed toward each other. Thereby, the hooks 415 of the elastic arms 411 are released from the inserting holes 315 of the tenons 31. Then the supporting member 30 is pulled up away from the base 40. That is, the supporting member 30 is conveniently manually detached from the base 40 without the need for any tools.

Advantageously, the base 40 can be detached from the supporting member 30 of the flat panel display 2 whenever desired. Therefore once the flat panel display 2 has been newly manufactured, it can be conveniently wrapped and transported at a reduced cost.

It is to be understood, however, that even though numerous characteristics and advantages of the present embodiment have been set out in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A flat panel display, comprising:
   a display module;
   a supporting member attached to the display module, and comprising at least one tenon and at least one positioning post, the at least one tenon extending down from a bottom of the supporting member and including at least one rib and an inserting hole; and
   a base having at least one elastic arm and defining at least one positioning hole;
   wherein when the supporting member engages with the base, the at least one tenon detachably engages with the at least one elastic arm and the at least one positioning hole engagingly receives the at least one positioning post whereby the supporting member is detachably engaged with the base.

2. The flat panel display as claimed in claim 1, wherein the at least one elastic arm comprises at least one groove and a hook.

3. The flat panel display as claimed in claim 2, wherein when the supporting member is engaged with the base, the at least one rib of the at least one tenon is engaged in the at least one groove of the at least one elastic arm, and the hook of the at least one elastic arm is engaged in the inserting hole of the at least one tenon.

4. The flat panel display as claimed in claim 1, wherein the at least one tenon is four tenons, two of the tenons extend down from a front wall of the supporting member, and the other two tenons extend clown from a rear wail of the supporting member, whereby said other two tenons are opposite said two of the tenons.

5. The flat panel display as claimed in claim 4, wherein the at least one rib of each of the tenons is located at an inner side of the tenon, and the inserting hole of each of the tenons is located below the at least one rib of the tenon.

6. The flat panel display as claimed in claim 5, wherein the base comprises a connecting portion and a main body, and the connecting portion extends upwardly from a middle portion of the main body.

7. The flat panel display as claimed in claim 6, wherein the at least one elastic arm of the base is four elastic arms, two of the elastic arms extend down at a front wall of the connecting portion, and the other two elastic arms extend down at a rear wall of the connecting member, whereby said other two elastic arms are opposite said two of the elastic arms.

8. The flat panel display as claimed in claim 7, wherein each of the elastic arms comprises a hook and at least one groove above the hook.

9. The flat panel display as claimed in claim 8, wherein when the supporting member is engaged with the base, the at least one rib of each of the tenons are engaged in the at least one groove of each of the elastic arms, and the hook of each of the elastic arms are engaged in the inserting hole of each of the tenons.

10. The flat panel display as claimed in claim 1, wherein the engagement between the at least one tenon and the at least one elastic arm is hidden from an exterior of the flat panel display in normal use.

* * * * *

UNITED STATES PATENT AND TRADEMARK OFFICE
CERTIFICATE OF CORRECTION

PATENT NO.       : 7,607,621 B2                                                              Page 1 of 1
APPLICATION NO. : 11/474583
DATED            : October 27, 2009
INVENTOR(S)      : Cai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 30 days.

Signed and Sealed this

Twelfth Day of October, 2010

David J. Kappos
*Director of the United States Patent and Trademark Office*